United States Patent
Brookhouse

[11] Patent Number: 5,816,475
[45] Date of Patent: Oct. 6, 1998

[54] PIPE CLAMP

[75] Inventor: Roger Stephen Brookhouse, Warwickshire, Great Britain

[73] Assignee: R.S. Brookhouse Engineering (Evesham) Ltd., United Kingdom

[21] Appl. No.: 693,179
[22] PCT Filed: Feb. 14, 1995
[86] PCT No.: PCT/GB95/00308
 § 371 Date: Sep. 30, 1996
 § 102(e) Date: Sep. 30, 1996
[87] PCT Pub. No.: WO95/21721
 PCT Pub. Date: Aug. 17, 1995

[30] Foreign Application Priority Data

Feb. 14, 1994 [GB] United Kingdom ............... 9402772

[51] Int. Cl.$^6$ ................................................ B23K 37/053
[52] U.S. Cl. ..................... 228/49.3; 228/212; 269/48.1
[58] Field of Search ......................... 228/49.3, 44.5, 228/50, 212; 269/47, 48.1; 219/60 R, 61.1

[56] References Cited

U.S. PATENT DOCUMENTS

| | | | |
|---|---|---|---|
| 4,165,831 | 8/1979 | Connell | 228/50 |
| 4,177,914 | 12/1979 | Clavin | 228/50 |
| 4,201,326 | 5/1980 | Connell | 228/50 |
| 4,285,458 | 8/1981 | Slavens | 228/50 |
| 4,363,954 | 12/1982 | Rinaldi | 219/160 |
| 5,110,031 | 5/1992 | Rinaldi | 228/50 |
| 5,356,067 | 10/1994 | Leduc | 228/49.3 |

FOREIGN PATENT DOCUMENTS

| | | |
|---|---|---|
| 0 193 812 | 9/1986 | European Pat. Off. . |
| 79655 | 2/1971 | Germany ............................. 228/49.3 |
| 2 067 945 | 8/1981 | United Kingdom . |

OTHER PUBLICATIONS

The Passo Welding System, Saipem, Brochure.
Brochure of SAIPEM (date unknown).

*Primary Examiner*—Samuel M. Heinrich
*Attorney, Agent, or Firm*—Fulwider Patton Lee & Utecht, LLP

[57] ABSTRACT

In accordance with the invention there is provided an internal line-up clamp for securing two adjacent pipe sections together in end-to-end relationship comprising a first clamping mechanism operable to extend a first set of circumferentially disposed clamping shoes radially into clamping engagement with the interior of a first pipe section; a second clamping mechanism operable to extend a second set of circumferentially disposed clamping shoes radially into clamping engagement with the interior of a second pipe section; and a back-up shoe mechanism comprising a plurality of circumferentially extending back-up shoes arranged to provide a radially outer cylindrical surface. The back-up shoes being located axially between the sets of clamping shoes and being extendible radially outwardly into engagement with the interior of the pipe sections when the sections are clamped by respective clamping mechanisms. Conveniently each of the back-up shoes is resiliently biased in a radially outward direction so as to be engageable under bias with the interior walls of and to bridge an axial spacing between adjacent pipe sections when they are clamped by the respective clamping mechanisms.

9 Claims, 2 Drawing Sheets

PIPE CLAMP

DESCRIPTION OF INVENTION

This invention relates to an internal clamping device for holding adjacent pipe sections rigidly in end-to-end relationship to enable a circumferential weld to be completed around the adjacent pipe ends to secure the pipe sections together.

Such general types of clamping devices are known in the art such as for example the internal pneumatic line-up clamp manufactured by CRC-Evans Pipeline International Inc of Houston Texas. This type of clamping device is self-propelled for movement within pipe sections and has two independently operable clamping mechanisms each of which is engageable with a respective adjacent end of two pipe sections which are to be welded together. Each of the clamping mechanisms comprises a plurality of circumferentially spaced apart radially extendible and retractable clamping shoes. The shoes in each mechanism are pneumatically operated by means of a double acting pneumatic piston movable on the centreline of the device to actuate the clamping shoes by means of a toggle linkage connected between the piston and the shoes. The two sets of clamping shoes are axially spaced apart so that one set may be radially outwardly extended into clamping engagement with the interior wall of a pipe section adjacent one end whilst the other set of clamping shoes may be similarly radially outwardly extended into clamping engagement with the interior wall of an adjacent pipe section adjacent one end so that the respective ends of the pipe sections may be rigidly held preparatory to being welded together. Subsequent to completion of a circumferential weld around the pipe section ends, the clamping shoes may be radially inwardly retracted and the device may be self propelled along one of the pipe sections to the other end thereof where a similar clamping and welding operation may be performed to secure another pipe section whereby an extended pipeline may be built up of a plurality of pipe sections.

When automatic circumferential welding processes are utilised it is usual to position the adjacent ends of pipe sections to be welded together so as to leave a small annular axial spacing therebetween. It will be appreciated that such spacing will be located intermediate the positions at which each of the respective pipe sections is clamped whereby, during the welding operation, welding detritus may fall through the spacing onto the clamping device. Also, after the welding has been completed, an extremely rough circumferential weld line may remain internally of the pipe sections.

In order to overcome the aforesaid problem it has been proposed to utilise what are known as back-up shoes, usually made of copper, and which are either attached to or used in lieu of one of the sets of clamping shoes. Such copper back-up shoes comprise segments of two differing configurations arranged alternately circumferentially and having respective circumferentially and radially overlapping chamfered end faces so as to present a radially outer circumferentially continuous cylindrical surface in both the fully retracted and fully extended positions of the back-up shoes. In use, if for example the copper back-up shoes are attached to or utilised in lieu of the front clamping shoes, the rear clamping shoes will firstly be radially outwardly extended into clamping engagement with an end of one of the pipe sections and the copper back-up shoes will then be radially outwardly extended into engagement with the other pipe section and also to bridge the annular spacing between the adjacent pipe section ends. This bridging is enabled because each of the back-up shoes has an axial dimension considerably in excess of the axial spacing between the pipe section ends which is required for welding purposes and thus when the back-up shoes are in clamping engagement with the pipe sections the shoes effectively provide a continuous supporting surface immediately adjacent the interior walls of the pipe sections. Thus, during the welding operation, welding detritus is contained within the annular channel bounded by the ends of the pipe sections and the circumferential channel base provided by the back-up shoes.

It is an object of the present invention to provide an improved internal line-up clamp having circumferentially extending back-up shoes which will offer certain advantageous features in comparison with those of known devices.

In accordance with the invention there is provided an internal line-up clamp for securing two adjacent pipe sections together in end-to-end relationship comprising a first clamping mechanism operable to extend a first set of circumferentially disposed clamping shoes radially into clamping engagement with the interior of a first said pipe section; a second clamping mechanism operable to extend a second set of circumferentially disposed clamping shoes radially into clamping engagement with the interior of a second said pipe section; and a back-up shoe mechanism comprising a plurality of circumferentially extending back-up shoes arranged to provide a radially outer cylindrical surface, said back-up shoes being located axially between said sets of clamping shoes and being extendible radially outwardly into engagement with the interior of said pipe sections when said sections are clamped by respective said clamping mechanisms. Conveniently each of said back-up shoes is resiliently biased in a radially outward direction so as to be engageable under said bias with the interior walls of and to bridge an axial spacing between adjacent pipe sections when they are clamped by the respective clamping mechanisms.

Each of said clamping mechanisms may include abutment means adjacent each clamping shoe and being movable therewith for engagement with a support part of an adjacent back-up shoe. Each said abutment means preferably is arranged to limit the radially outward movement of an associated said back-up shoe under its resilient spring bias and also to permit retraction of said back-up shoe by engagement of said abutment therewith when the clamping shoe is retracted.

Each of said clamping mechanisms is actuable independently of the other preferably by fluid pressure means comprising a pneumatic piston and cylinder device operable to extend and retract all of the clamping shoes of a said clamping mechanism in unison. Each of the back-up shoes is conveniently biased in a radially outward direction by means of a coil compression spring.

Thus, in use, initially a said first clamping mechanism may be actuated tinder pneumatic pressure to extend its set of clamping shoes radially outwardly into clamping engagement with the interior wall of a first pipe section adjacent its end. During and after completion of such radially outward extension of the first set of clamping shoes, the back-up shoes remain in their radially inner positions due to the engagement therewith of the respective abutments on the clamping shoes of the second clamping mechanism. Subsequently the second clamping mechanism may be actuated under pneumatic pressure to extend its set of clamping shoes radially outwardly into clamping engagement with the interior wall of the second pipe section adjacent its end. During radially outward movement of the second set of clamping shoes, the back-up shoes are permitted to move radially outwardly under their spring bias so that when clamping engagement of the second set of clamping shoes with the second pipe section has been completed, the back-up shoes are in spring urged engagement with the interior walls of the adjacent ends of both pipe sections.

All of said back-up shoes are preferably of identical configuration having planar end faces extending obliquely from one axial side of the shoe to the other, the angle of inclination of each end face of each shoe being equal and opposite with respect to a said axial side of the shoe so that each shoe has the appearance of an isosceles trapezium when viewed in a radial direction. Circumferentially adjacent back-up shoes are arranged so as to face axially in opposing directions whereby an oblique end face of one back-up shoe is in contact with a corresponding oblique end face of an adjacent shoe, the shoes being arranged circumferentially to provide a substantially continuous cylindrical radially outer surface.

The oblique end faces of the back-up shoes are so configured that adjacent such faces remain in proximate sliding contact with one another during radial extension and retraction of the back-up shoes, each said shoe being mounted to accommodate a limited degree of axial movement which will occur during the radial extension and retraction of the shoes.

Other features of the invention will become apparent from the following description given herein solely by way of example with reference to the accompanying drawings wherein.

Figure 4:
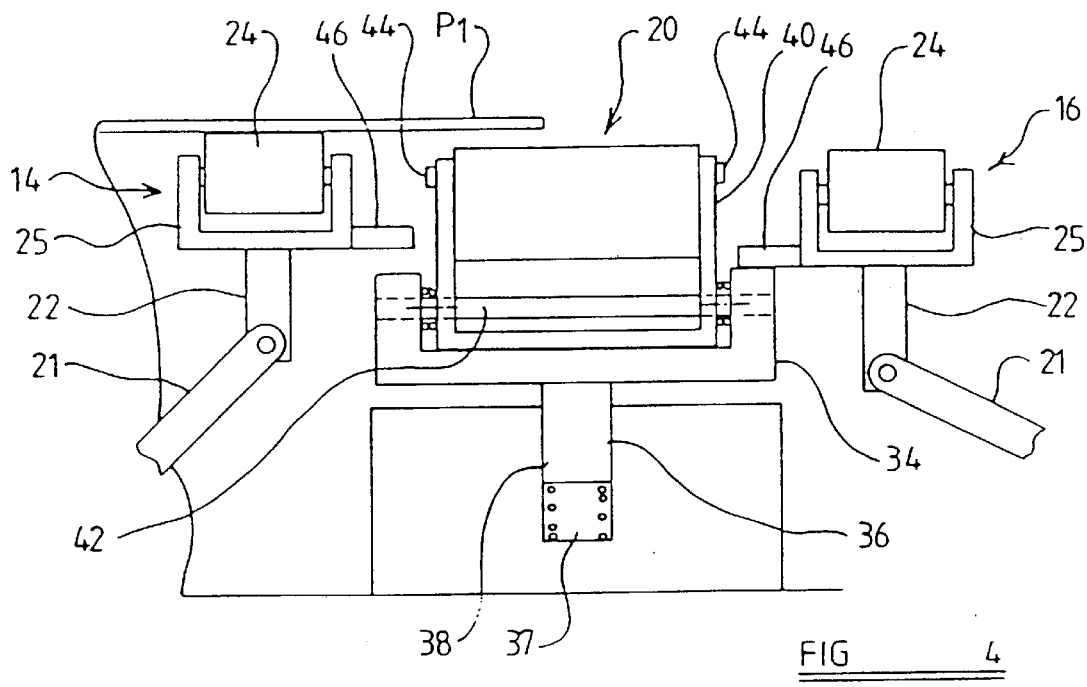
Figure 5:
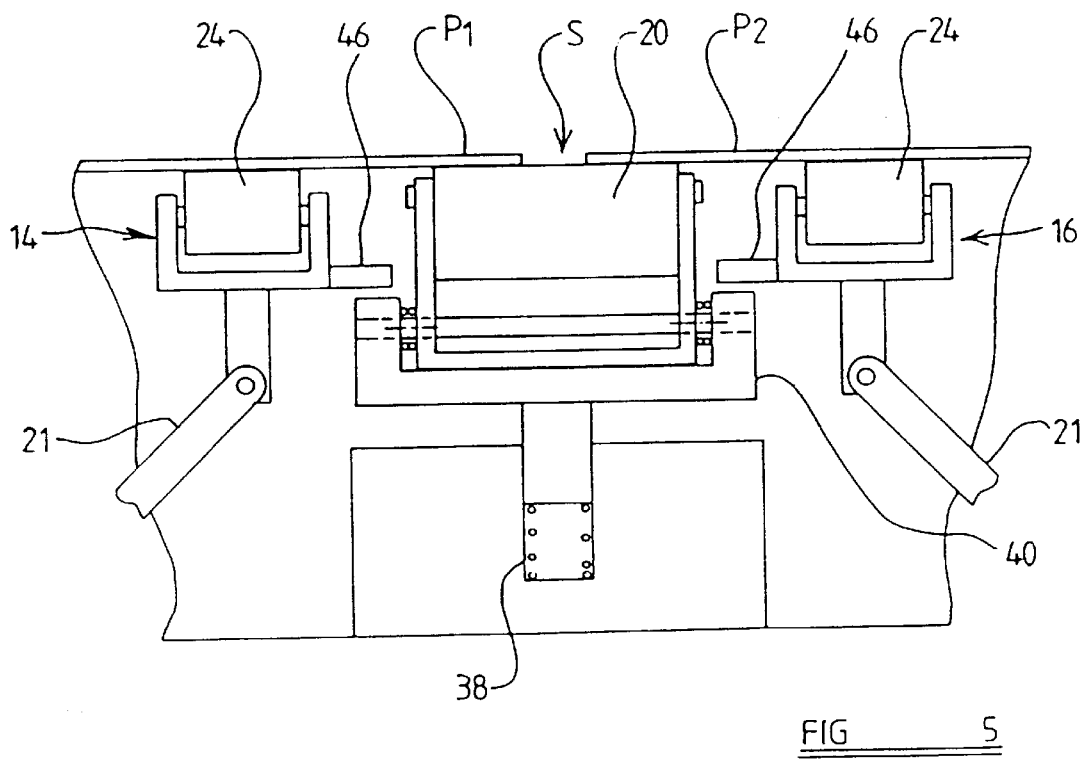

FIG. 4 is a diagrammatic sectional view showing the position adopted by one of the clamping shoes of one set thereof when in clamping engagement with the interior of a pipe section and also showing the position adopted by a back-up shoe and a clamping shoe of the other set thereof when in their retracted positions; and FIG. 5 is a similar view to that of FIG. 4 but showing the positions adopted by the clamping shoes and back-up shoes when in their radially extended clamping positions in engagement with adjacent pipe sections ready for welding.

Figure 1:
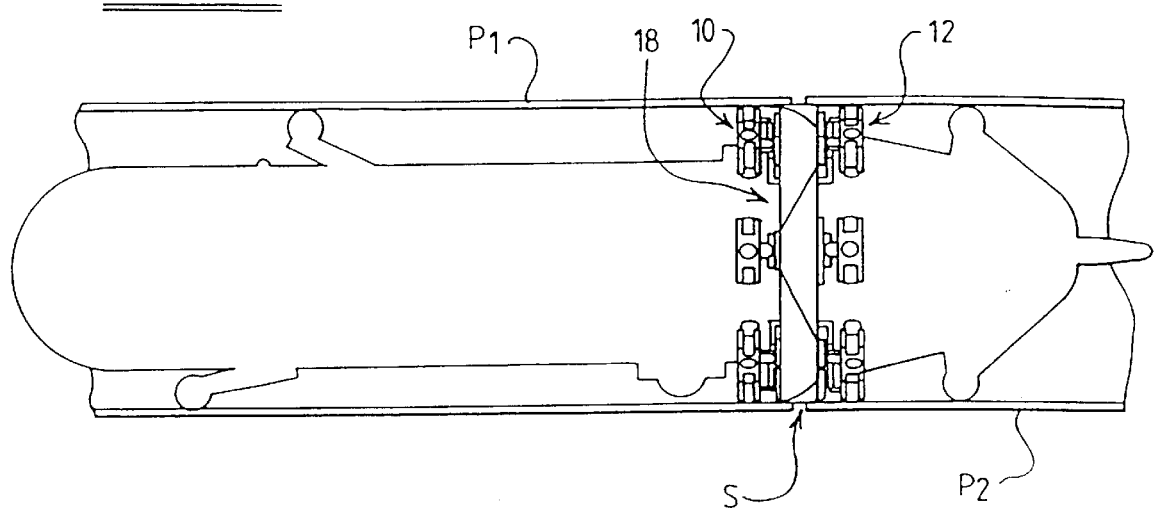
FIG. 1 is a diagrammatic side view of an internal pneumatic line-up clamp constructed in accordance with the invention clamped in position at a joint to be effected between two adjacent end-to-end pipe sections.
Figure 2:
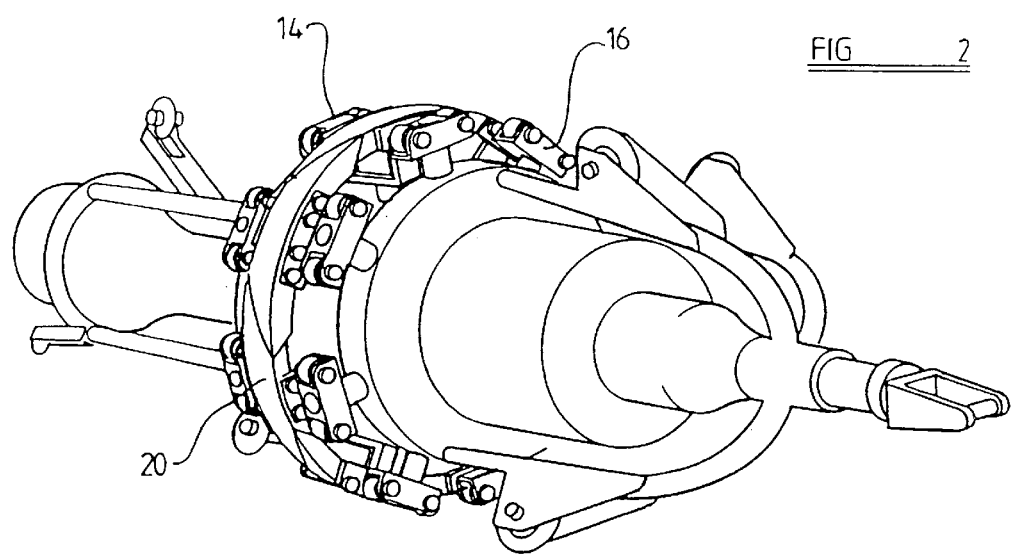
FIG. 2 is a diagrammatic perspective view of the clamp shown in FIG. 1.
Figure 3:
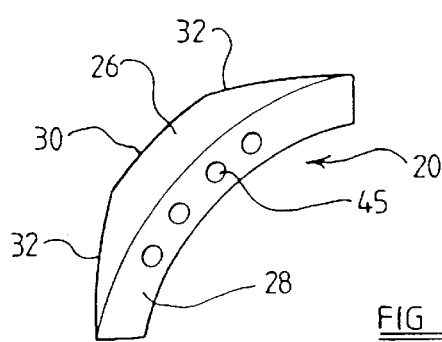
FIG. 3 is a perspective view of one of the back-up shoes of the clamp.

In FIGS. 1 and 2 of the drawings there is shown in diagrammatic form an internal pneumatically actuated line-up clamp including front and rear sets 10 and 12 of circumferentially spaced apart radially movable clamping shoes 14 and 16 respectively and a set 18 of back-up shoes 20 arranged to extend circumferentially of the clamp and being positioned axially between the two sets of clamping shoes.

Each set of clamping shoes is actuable by a pneumatically powered clamping mechanism in a manner known per se. A double acting pneumatically operated piston (not shown) movable linearly on a centreline of the clamp is connected via a toggle linkage, one link 21 of the linkage being shown in FIGS. 4 and 5, to a set of circumferentially spaced rods 22 each of which is movable radially in a guide in part of the clamp housing. The outer end of each rod 22 carries a clamping shoe 14, 16 thereon each of which may conveniently be of the form illustrated comprising a pair of circumferentially spaced rollers 24 each mounted in a support bracket 25 for rotation about an axis parallel to the longitudinal axis of the line-up clamp. Thus all of the clamping shoes 14, 16 of a respective set 10, 12 thereof are movable simultaneously with one another either radially inwardly or radially outwardly of the clamp and each of the sets 10 and 12 of clamping shoes is actuable independently of the other.

A back-up shoe mechanism comprises a set of identically configured back-up shoes 20 arranged circumferentially relative to one another to provide a radially outer substantially continuous cylindrical surface disposed axially between the front and rear sets 10, 12 of clamping shoes. Each back-up shoe 20 is conveniently formed of copper and has a circumferentially arcuate outer surface 26 which, when viewed in a radial direction, is of an isosceles trapezium form i.e. each back-up shoe has a longer axial side 28 and a shorter axial side 30 which are parallel to one another and two end faces 32 each of which extends obliquely of the shoe from one axial side 28 to the other axial side 30 thereof at equal and opposite angles. Alternate back-up shoes 20 are arranged so as to face in opposite directions whereby adjacent oblique end faces 32 are in proximate slidable contact with one another as will be further explained below and whereby a said substantially continuous radially outer cylindrical surface is provided.

Each said back-up shoe 20 is carried at the radially outer end of a support saddle 34 which itself has a cylindrical stem 36 extending radially into a bore 37 of the clamp housing located between the front and rear sets 10, 12 of clamping shoes. Each bore contains a strong coil compression spring 38 bearing against the radially inner end of a saddle stem 36. Within the saddle 34 there is mounted a support stirrup 40 for each back-up shoe 20, said stirrup 40 being mounted for limited sliding movement axially of the clamp upon a shaft 42 extending axially from end to end of the saddle 34. Spring means are provided to bias the stirrup 40 either axially towards one end of the saddle 34 or to centre the stirrup 40 in the saddle 34. A said back-up shoe 20 is mounted in each said stirrup 40 by means of bolts 44 extending axially through the side walls of a stirrup 40 into threaded bores 45 in the opposed axial sides 28 and 30 of the back-up shoe 20.

As will be seen from the drawings, each of the support brackets 25 for each of the clamping shoes 14 and 16 includes an axially extending abutment means in the form of a tongue 46, the tongues of opposed pairs of clamping shoes 14, 16 extending towards one another so as to overlie the radially outer edges of an adjacent back-up shoe saddle 34.

When the clamping shoes 14, 16 of either set thereof are in their radially innermost retracted positions the back-up shoes 20 will also be in their radially innermost retracted positions by virtue of the tongues 46 on one or both of each of the sets 10 and 12 of clamping shoes bearing upon the back-up shoe saddles 34 to press them radially inwardly against the bias of their coil compression springs 38. Conversely, when both of the clamping shoe sets 10 and 12 are in their radially outermost extended positions the back-up shoes 20 will be in radially outwardly extended positions under the influence of their coil compression springs 38 but being limited against further radially outward movement by abutment of the saddles 34 against said tongues 46 of the clamping shoes.

The oblique end faces 32 of the clamping shoes 20 lie in radial planes so as to ensure that the faces remain in sliding contact with one another during radial extension and retraction of the shoes 20. It will be appreciated that radial extension and retraction of the back-up shoes 20 whilst remaining in sliding contact with one another at their oblique end faces 32 will necessitate relative axial movement between adjacent shoes and this is accommodated by movement of the support stirrups 40 on their shafts 42 within the respective saddles 34 as described above.

In use, a line-up clamp is inserted into a first pipe section P1 and clamped thereto in known manner by radially outwardly extending the clamping shoes 14 of the set 10 into clamping engagement with the interior wall of the pipe section against its end. A second pipe section P2 to be welded to the first section is then clamped by the second set 12 of clamping shoes 16 after having been manually positioned relative to the first pipe section so as to leave the required small annular axial spacing S therebetween for welding purposes. During radially outward extension of the second set of clamping shoes 16 into clamping engagement with the interior wall of the second pipe section P2 the back-up shoes 20 will be permitted to move radially outwardly under the influence of their respective coil compression springs 38 into firm engagement with the interior walls of both pipe sections P1 and P2 and to bridge the said axial spacing S therebetween. Thus the spacing S is in the form of a channel defined by the end walls of the adjacent pipe sections P1 and P2 and having a base provided by the back-up shoes 20, said base being of substantially continuous cylindrical configuration whereby, during the welding process, welding materials will be prevented from passing through the spacing S onto the clamp and, after welding, an uninterrupted clean welded surface will be provided to the interior of the joined together pipe sections P1 and P2.

After welding has been completed either one of the sets of clamping shoes 14 or 16 is radially inwardly retracted. This radially inward movement of the clamping shoes will also cause radially inward retraction of the back-up shoes 20 by virtue of the tongues 46 on the one set of clamping shoes 14 or 16 pressing the respective saddles 34 of the back-up shoes radially inwardly against the influence of their respective compression springs 38. Subsequently the other set of clamping shoes may be radially inwardly retracted thereby freeing the clamp for movement longitudinally of the pipe to the end of another pipe section for another welding operation.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. An internal line-up clamp for securing two adjacent pipe sections together in end-to-end relationship, comprising:
    a first clamping mechanism operable to extend a first set of circumferentially disposed clamping shoes radially into clamping engagement with the interior of a first said pipe section;
    a second clamping mechanism operable to extend a second set of circumferentially disposed clamping shoes radially into clamping engagement with the interior of a second said pipe section; and
    a back-up shoe mechanism comprising a plurality of circumferentially extending back-up shoes arranged to provide a radially outer cylindrical surface, said back-up shoes being located axially between said sets of clamping shoes and being extendible radially outwardly into engagement with the interior of said pipe sections when said sections are clamped by respective said clamping mechanisms, wherein each of said back-up shoes is resiliently biased in a radially outward direction so as to be engageable under said bias with the interior walls of and to bridge an axial spacing between adjacent pipe sections when they are clamped by said respective clamping mechanisms, wherein each of said clamping mechanisms includes abutment means adjacent each clamping shoe and moveable therewith for engagement with a support part of an adjacent back-up shoe, and wherein each said abutment means is arranged to limit the radially outward movement of an associated said back-up shoe under its resilient spring bias and also to provide for retraction of said back-up shoe by engagement of said abutment therewith when the clamping shoe is retracted.

2. A clamp according to claim 1 wherein each of said clamping mechanisms is actuable independently of the other.

3. A clamp according to claim 1 wherein each of said clamping mechanisms is operable by fluid pressure means comprising a pneumatic piston and cylinder device operable to extend and retract all of the clamping shoes of a said clamping mechanism in unison.

4. A clamp according to claim 1 wherein each of the back-up shoes is biased in a radially outward direction by means of a coil compression spring.

5. A clamp according to claim 1 wherein all of said back-up shoes are of identical configuration to one another, having planar end faces extending obliquely from one axial side of the shoe to the other, the angle of inclination of each end face of each shoe being equal and opposite with respect to a said axial side of the shoe so that each shoe has the appearance of an isosceles trapezium when viewed in a radial direction, and circumferentially adjacent back-up shoes are arranged so as to face axially in opposing directions whereby an oblique end face of one back-up shoe is in contact with a corresponding oblique end face of an adjacent shoe, the shoes being arranged circumferentially to provide a substantially continuous cylindrical radially outer surface.

6. A clamp according to claim 5 wherein the oblique end faces of the back-up shoes are so configured that adjacent such faces remain in proximate sliding contact with one another during radial extension and retraction of the back-up shoes, each said shoe being mounted to accommodate a limited degree of axial movement which will occur during the radial extension and retraction of the shoes.

7. A clamp according to claim 1 wherein the back-up shoes are of copper.

8. A method of securing two adjacent pipe sections together in end-to-end relationship by use of a clamp according to claim 1, comprising the steps of:
    clamping the first and second pipe sections by operation of the first and second clamping mechanisms respectively; and
    extending the back-up shoes of the back-up shoe mechanism into engagement with the interior of said pipe sections between the clamping mechanisms.

9. A method according to claim 8 further comprising the step of welding between adjacent end portions of the pipe sections with the back-up shoes bridging between said adjacent end portions.

* * * * *